Aug. 19, 1930.  G. S. NEELEY  1,773,274
SCALE REMOVING AND PREVENTING APPARATUS
Filed Nov. 21, 1925  6 Sheets-Sheet 1

Fig.1

Inventor
George S. Neeley
By Cornwall, Birdell & Janus
Atty's.

Aug. 19, 1930.  G. S. NEELEY  1,773,274
SCALE REMOVING AND PREVENTING APPARATUS
Filed Nov. 21, 1925   6 Sheets-Sheet 3

Inventor
George S. Neeley
By Cornwall, Bedell, Janney
Attys.

Aug. 19, 1930.    G. S. NEELEY    1,773,274
SCALE REMOVING AND PREVENTING APPARATUS
Filed Nov. 21, 1925    6 Sheets-Sheet 4

Inventor
George S. Neeley
By Cornwall, Beddl & Janno
Attys.

Patented Aug. 19, 1930

1,773,274

UNITED STATES PATENT OFFICE

GEORGE SPENCER NEELEY, OF HARTFORD, ILLINOIS, ASSIGNOR OF ONE-HALF TO GRIFFIN WATKINS, OF ALTON, ILLINOIS

SCALE REMOVING AND PREVENTING APPARATUS

Application filed November 21, 1925. Serial No. 70,544.

This invention relates to method and apparatus for removing scale incrustations and preventing scale formation and corrosion of tanks, boilers, and the like, and is an improvement over the invention disclosed in my co-pending applications, Serial No. 751,543, filed November 22, 1924, and Serial No. 14,913, filed March 12, 1925.

Briefly the invention consists in placing the metal shell of the container and its water content in an external electric circuit, thereby diverting or counteracting the natural electric current generated in the boiler system by the operating conditions of the boiler. Thus the so-called natural electric current is disturbed or neutralized and its tendency to set up electro-chemical action in the boiler, which action is responsible for the scaling or corrosion of the metal parts of the system, is thereby checked or eliminated so that such metal parts are maintained free of scale and protected against corrosion.

The present invention is more particularly directed to a novel arrangement of a plurality of electric circuits connected independently of each other to the metal shell of the water container, or the water contents thereof, or both, whereby a plurality of electric currents preferably of the alternating variety, are applied to said water container and/or water contents thereof to counteract the detrimental action of the natural self generated current. These applied electric currents have different characteristics or differential relation with each other, so that they exercise differential effects on the elements to which they are applied and do not interfere with each other. This differential relation may be accomplished in a number of ways, as for instance, by the employment of two electric currents, one of which has a comparatively large voltage and low amperage, while the other has a comparatively low voltage and large amperage, or by the use of currents having differential phase relation with each other, or the differential relation of the applied currents can be produced in some other way.

The theory held by chemists and engineers, up to the present time, as to the formation of scale deposits on the internal heating surfaces of steam boilers, is a "straight chemical combination superinduced by heat". It can be demonstrated that this theory is not fully correct and, instead, that scale formation on the internal heating surfaces of steam generators is a process identical with that used in the art of electro-plating with this difference,—in the case of the steam generator, the necessary direct current electrical energy is self-generated, through the well-known principle of the thermo-couple. Thus, the boiler or steam generator becomes a huge thermo-couple, due to the simple and natural combination of the elements composing the metallic content of the shell plates as one element, the water with its metallic constituents or other scale forming matter held in solution, forming the second element, while the application of the heat of the furnace to the combination furnishes the necessary third element, to complete the principle of the thermo-couple. The direction of this thermo-dynamically generated current has been determined to be in a direction from the cooler portions of the water content, toward the metallic heating surfaces of the steam generator. The whole combination, including the metallic and water content of every boiler, is such that a perfectly self-contained electric generator, and circulatory system is provided, and without the necessity for this self-generated current disclosing its presence by any external manifestation and is the one reason why engineers have not discovered its presence and origin before now. Given the necessary electrical direct current energy, with a natural circuit through the water content of the steam boiler, it is then very easy to see how scale matter is magnetically attracted from the constant supply of feed-water, and is then electroplated on the heating surfaces of the shell plates and tubes, the cycle of operation being repeated over and over by the same agency and as long as the boiler or steam generator is under normal operating conditions.

Scale matter which comes into the boiler with the feed-water supply is endowed by nature with a certain definite magnetic polarity. It is a further object of my invention to supply a novel means for continuously demagnetizing the scale matter immediately before it is liberated into the general circulation of the steam generator, and thermodynamically-generated current of the boiler.

Hydrogen is known to be an element that is destructive to existing scale deposits and also assists in the prevention of the formation of new scale. Another object of my invention is to take advantage of this fact in so locating my alternating current distributors that the incoming feed-water supply is made to continuously sweep and wash over the outer electrolyzed surfaces of these distributors, thereby forcing all hydrogen that may be developed on these surfaces to enter the general water circulation of the boiler with the feed-water.

Further objects of the invention are to provide a novel method of subjecting the container and its water content, simultaneously to the agitating action of a plurality of electric currents, which affect the container and the water content thereof differentially with respect to each other, so that the action of one current is supplemented or augmented by the action of the other current and which currents do not interfere with or hinder each other, but each current is substantially confined to its predetermined path. Thus the disorganizing combined action of external or applied currents produces a more thorough electrical agitation of the water content and the scale matter contained therein and provides for rapid disintegration of the scale beds where they have been already formed. This method is especially desirable in large boiler installations or containers of large capacities or where the boilers are heavily scaled and it is desired to remove the scale rapidly.

Still further objects of the invention are to subject the feed water supply to the powerful action of an alternating current simultaneously with the rising temperature of said water, which latter takes place naturally upon the ingress of the water into the interior of an operating steam generator.

Additional objects of the invention are to provide an improved form of distributor whereby the fresh water admitted into the boiler system is discharged in close proximity to or caused to travel through said distributor, thereby enabling the incoming feed water to come in immedate contact with the electrically charged surfaces of the distributor and insuring thorough and efficient distribution of the electrically charged water throughout the whole boiler system.

With these and other objects in view, my invention consists in certain novel features of construction and arrangement of parts, hereinafter more fully described and claimed, and illustrated in the accompanying drawings, in which—

Figure 1:
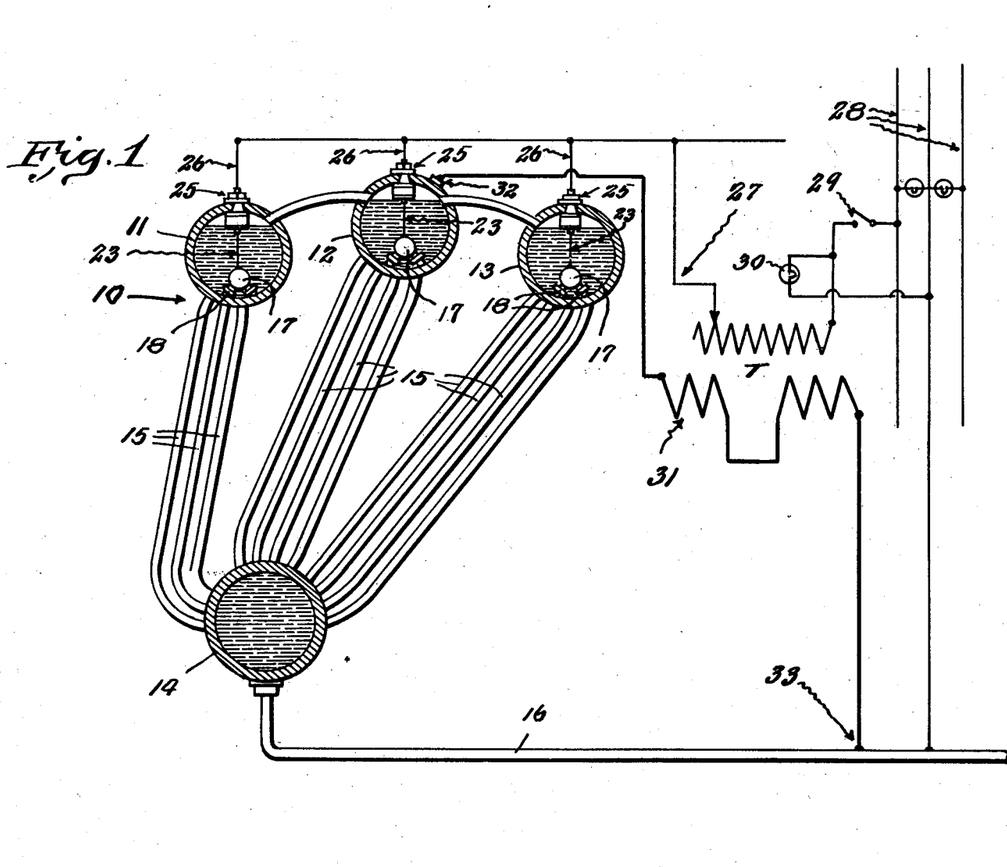
Figure 1 is a diagrammatic view of the boiler and electrical circuits whereby two electric currents of different phase relation may be simultaneously sent through the boiler system.
Figure 5:
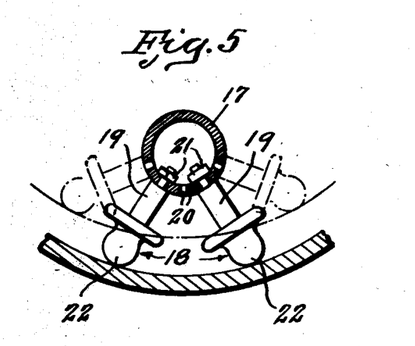
Figure 5 is a vertical cross section taken on line 5—5 of Figure 4.

Referring by numerals to the accompanying drawings, 10 indicates an apparatus equipped with my invention, said apparatus being in the present instance in the form of a stationary boiler comprising four cross drums 11, 12, 13, and 14, respectively, which are connected together by three banks of water tubes 15, one of said cross drums 14 being located below the other drums and provided with the usual blow-off pipe 16. Each of the first three drums 11, 12, and 13 has arranged therein a longitudinally disposed pipe or distributor 17 which is supported therein by legs 18. Preferably each leg consists of a shank member 19, one end of which is received in an aperture 20 and is secured in position therein by a nut 21 screw-seated on the threaded portion of said end. The opposite or lower end of said shank portion receives a glass insulator 22, preferably of the type commonly used in electric transmission lines. Thus when distributor 17 is in position, it is insulated from the metal wall of the container by insulators 22. There are a series of apertures 20 arranged radially about the axis of distributor 17 whereby by locating legs 18 in the proper apertures such distributor can be spaced the desired distance from the wall of the container as shown in Figure 5.

Figures 6, 7, 8:
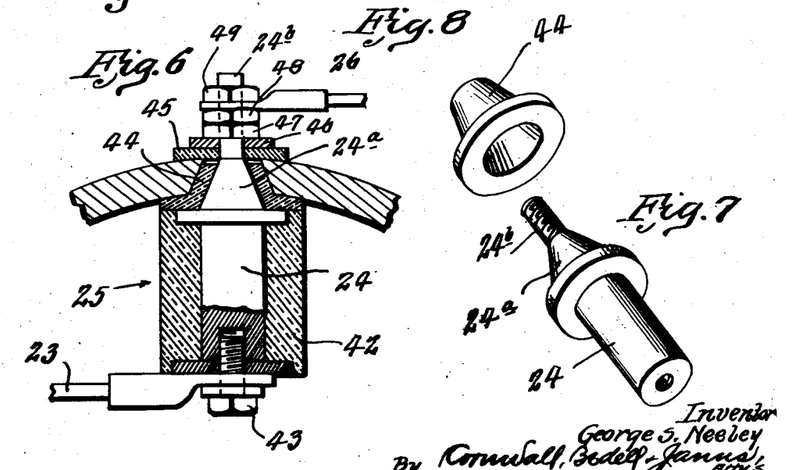
Figure 6 is a vertical cross sectional view of one of the insulated connectors.
Figure 7 is a perspective detail view of the connector element.
Figure 8 is a perspective detail view of the insulating sleeve utilized for insulating the metal element or connector from the metal wall of the boiler.

Extending from each distributor and connected thereto is a wire 23, the upper end of which is connected to the metal element 24 of insulator 25 which is arranged in the wall of the container and preferably in the uppermost portion thereof. These insulators provide external means for connecting the terminals 26 of an outside electric circuit electrically with the distributors arranged in the containers. Where two electric currents are simultaneously used as in the form shown in Figure 1, one end of a primary circuit 27 of a transformer T is connected to terminals 26 and the other end of said circuit 27 is connected to one of the supply lines, in the present instance, of a three wire main line circuit 28. A switch 29 is interposed in circuit 27 between the transformer and the supply line whereby said circuit may be interrupted when so desired.

A pilot lamp 30 is placed in said circuit 27 and provides visible means for the operator. One of the main supply lines of circuit 28 is connected to blow-off pipe 16, thereby completing the primary circuit 27 so that electric current can travel from transformer T through terminal connections 26 to distributor 17 and hence through the water in drums 11, 12 and 13, and through the metal portions of the latter to tubes 15, hence to drum 14 and then through the blow-off pipe 16 to the other supply line of circuit 28.

The secondary circuit 31 of transformer T has one terminal connected to the metal part of one or more of drums 11, 12 and 13, as indicated at 32, and the other terminal of said secondary circuit is connected to the blow-off pipe 16 as indicated at 33. Thus the metal portions of the boiler system are charged with the secondary or induced current which is of heavy volume in addition to being charged with the electric current supplied by the primary circuit. The charging of the metal portions of the boiler system with the secondary or induced alternating current is particularly desirable in large boiler installations having large areas of metal surfaces which would have a tendency to diffuse and consequently lessen the resultant effects. Also a better distribution of the electric current through the metal portions of the boiler system is assured by the use of secondary current in addition to the use of primary current as the terminal or terminals of the secondary circuit can be connected to cross drums 11, 12, and 13 at points remote from tubes 15 in order to prevent short-circuiting of the current through parts of the upper cross drums and insuring proper distribution of the secondary current through the tube sections of the boiler.

The exciting or applied currents are simultaneously distributed through the boiler system and as they have differential co-relation, they in no wise interfere with each other, while the disorganizing action of the exciting system is doubled or greatly increased. This is particularly advantageous in cases where a heavy scaled boiler is to be treated or where a rapid removal of scale is desired. When two currents of different phase relation are used, there is about one hundred eighty (180°) degrees difference in the phase and time relation of the two currents. When currents of different characteristics are used, as for instance when supplied by a transformer, the two currents act differentially on the metal container and the water content, the primary current being chiefly active in treating the water and preventing formation of scale, while the secondary current being mostly used to act on and protect the metal. However, the two currents in their action overlap each other so that both elements, namely metal and water, are subjected to the agitating action of both currents.

Figure 2:
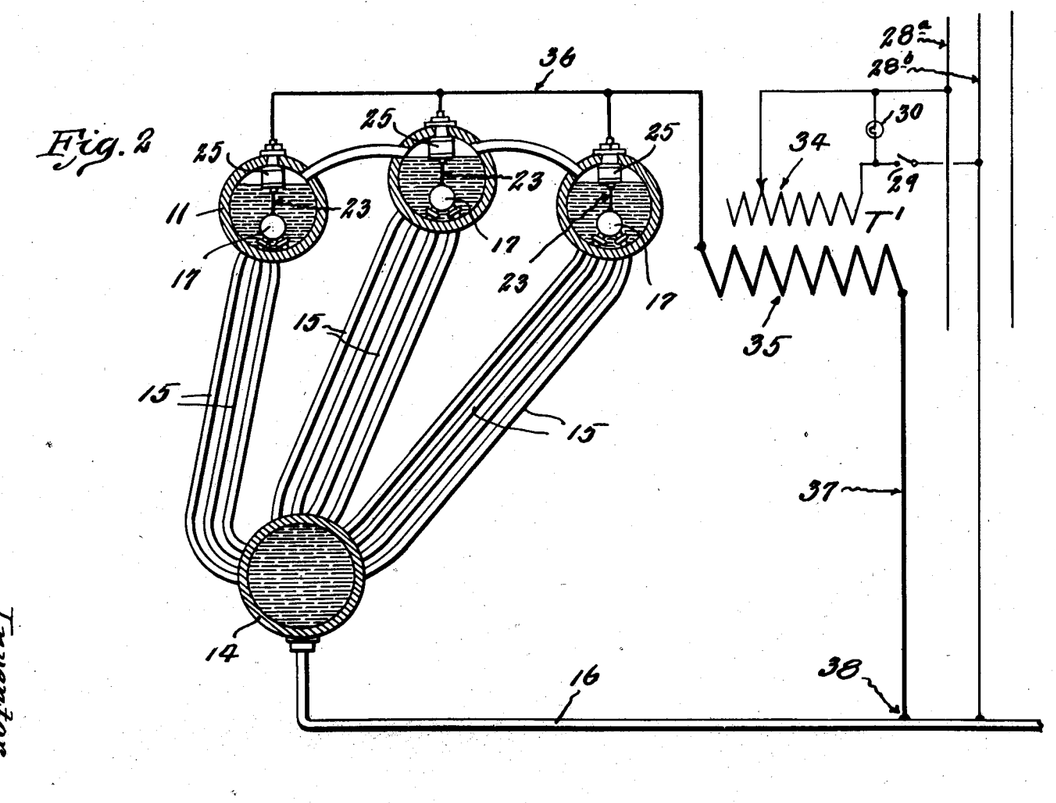
Figure 2 is a similar view but showing only the second circuit of the transformer connected to the system.

In some instances, it may not be desirable or permissible to connect the primary circuit to the boiler apparatus, in which case the method illustrated in Figure 2 is used. In this form the primary coil 34 of transformer T' is connected to the main supply lines 28$^a$ and 28$^b$ and only the secondary coil 35 of the transformer is connected to the boiler system. One end of the secondary coil is connected by connection 36 to plugs or insulators 25 which in turn are connected to the distributors 17 located in drums 11, 12, and 13, and the other terminal of secondary coil 35 is connected by connection 37 to blow-off pipe 16 as at 38, thereby completing the circuit between the coil and the boiler system.

Figure 3:
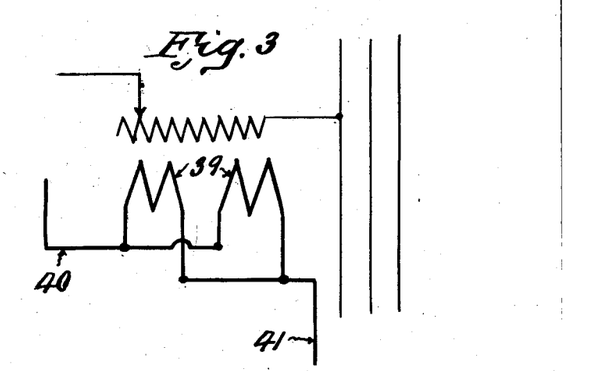
Figure 3 is a diagrammatic view showing transformer connections for varying the volume of the secondary circuit.
Figure 4:
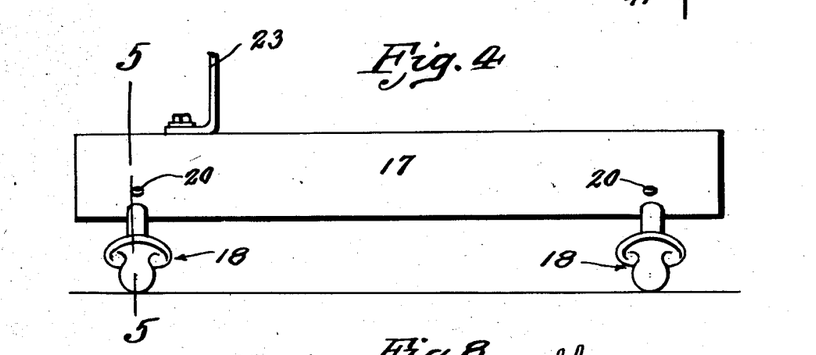
Figure 4 is a side elevational view of one of the distributors.

Figure 3 illustrates a method of connecting the two secondary coils 39 of the transformer in parallel with wire connections 40 and 41, which latter are connected to the boiler system. In this form, the volume of secondary current is increased, while the voltage or pressure thereof is reduced, while in the form shown in Figure 1 the pressure of the secondary current is increased, and the volume reduced.

The construction of insulator 25 is shown in detail in Figure 6 and shows the lower portion of element 24 which is arranged within the drum covered by a sleeve 42 of insulating material. Wire 23 is connected to the lower end of element 24 by a suitable fastening device 43. The upper end of element 24 has a cone-shaped extension 24$^a$ which extends through the wall of the drum and is insulated therefrom by a cone-shaped insulation sleeve 44. Extension 24$^a$ terminates in a threaded portion 24$^b$ which receives an insulating washer 45 placed against the outer face of the wall of the drum and a washer 46 which is forced against the insulating washer by a nut 47 and a lock nut 48, while a nut 49 secures wire connection 26 in position on the threaded end 24$^b$. When nuts 47 and 48 are screwed down tightly, cone-shaped extension 24$^a$ and the sleeves 44 are drawn upwardly through the opening in the wall of the drum thereby forming a fluid-tight joint and preventing escape of steam therethrough, washer 45 forming an additional seal. Thus the insulator 25 provides suitable means for establishing connection between the distributor located within the drum and the electric circuit located externally of the drum and at the same time forms a perfect seal with the wall of the drum.

Figures 9, 10:
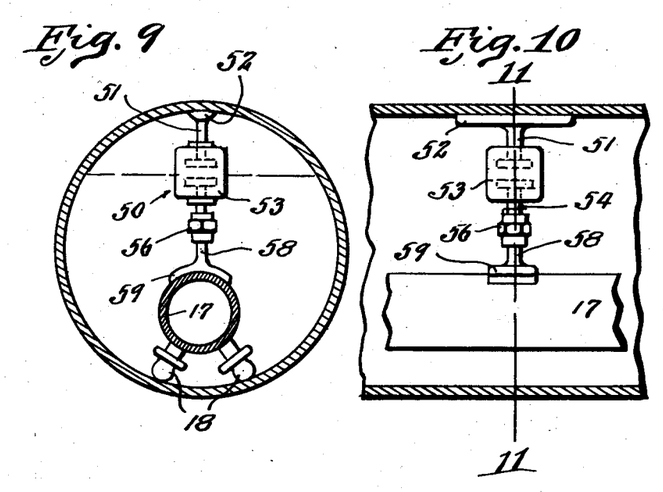
Figure 9 is a vertical cross section through one of the drums showing the distributor arranged therein and adjustable means utilized for holding said distributor against movement.
Figure 10 is a side elevational fragmental view of said distributor and said attaching means.
Figure 11:
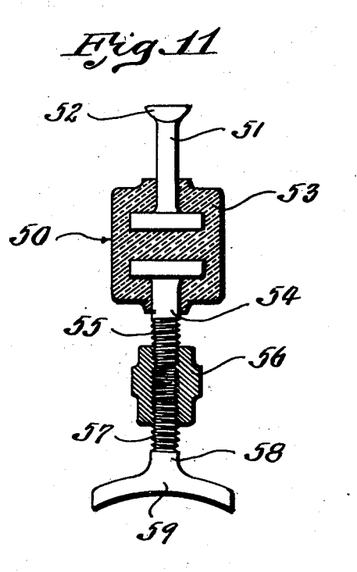
Figure 11 is an enlarged vertical cross section taken on line 11—11 of Figure 10.

To hold the distributor in position in the drum, and prevent its accidental displacement, I provide an extensible member 50 which can be easily placed in position and manipulated to bear pressure on the distributor and hold it in place. This member consists of a post 51 the upper end of which is provided with a horizontally disposed foot 52 which is adapted to bear against the underside of the upper portion of the wall of the drum. The lower end of this post is rigidly held in a block 53 formed of insulating material in which is also embedded the upper enlarged end of a post 54. The latter extends downwardly from said block and terminates in a threaded portion 55 which is received in an internally threaded coupling 56. This coupling also receives the upper end 57 of post 58, said end 57 and the corresponding end of coupling 56 being threaded in opposite direction to end 55 whereby, by turning the coupling in the proper direction, posts 54 and 58 may be moved in axial direction relative to each other. Post 58 terminates in an arcuate foot 59 which is adapted to engage and be transversely disposed on the upper face of distributor 17 as shown in Figure 9. When extensible member 50 is placed in position in the drum, coupling 56 is turned in the proper direction to move posts 54 and 58 away from each other, thereby forcing foot 59 under pressure against the distributor 17 so that the latter is held immovable in the drum.

When feed water is admitted to the boiler, it is desirable to discharge the water as close as possible to the distributor in order to bring the water in close contact with the electrically charged surfaces of the distributor.

Figure 12:
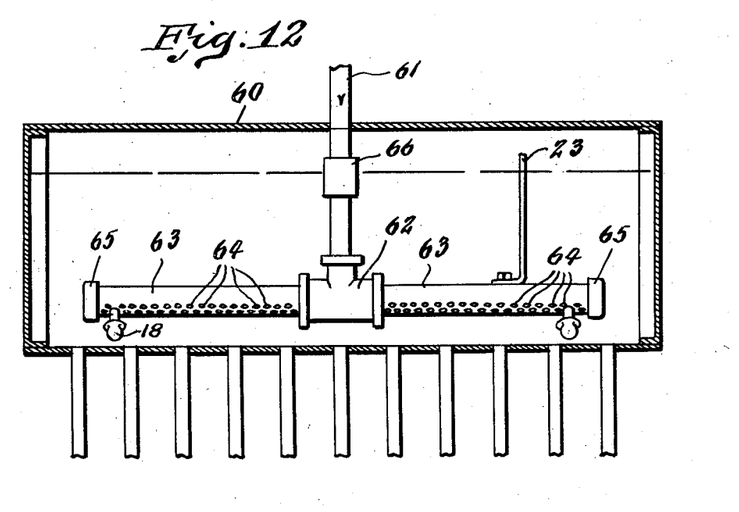
Figure 12 is a longitudinal cross section through one of the cross drums of a boiler and showing the distributor as an integral part of the feed water discharge and supply system.

In Figure 12 a cross drum of a boiler is shown in which the alternating current distributor is made so that it becomes an integral part of the feed water discharge and distributing system. The feed water is admitted into a drum 60 by a pipe 61 which connects to a T 62. Distributing elements 63 in the form of pipes are connected at their inner ends to a T 62 and are supported in the drum by insulators 18. Distributor pipes 63 are provided with a series of apertures 64 through which the water conveyed thereinto through pipes 61 is discharged outwardly into the drum, the outer ends of pipes 63 being preferably closed by caps 65. Distributor pipes 63 being electrically charged through connection 23, the fresh feed water passing through apertures 64 is electrically charged, thereby insuring thorough distribution of the electric current throughout the water content of the boiler.

An insulated section 66 is interposed in a pipe 61 at a point between the wall of drum 60 and the T 62 in order to preserve the insulation between the distributor pipes 63 and the drum.

Figure 13:
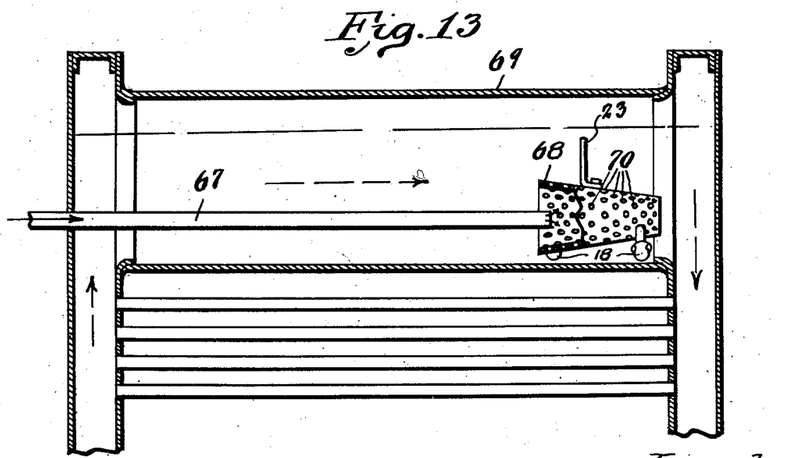
Figure 13 is a longitudinal cross section through another type of boiler showing a modified form of distributor for use in connection with the discharge pipe of the feed water system.

Figure 13 shows another form of distributor in which the feed water pipe 67 is caused to discharge the water over the surfaces of a cone-shaped perforated distributing element 68 which is arranged in boiler 69 and insulated therefrom by supports 18. This distributor is provided with apertures 70 to permit the water to escape therethrough, the end of the feed pipe 67 being arranged in the open large end of member 68, the opposite end being closed.

This method of distribution is particularly applicable to boilers of the Edgmoor type.

Figure 14:
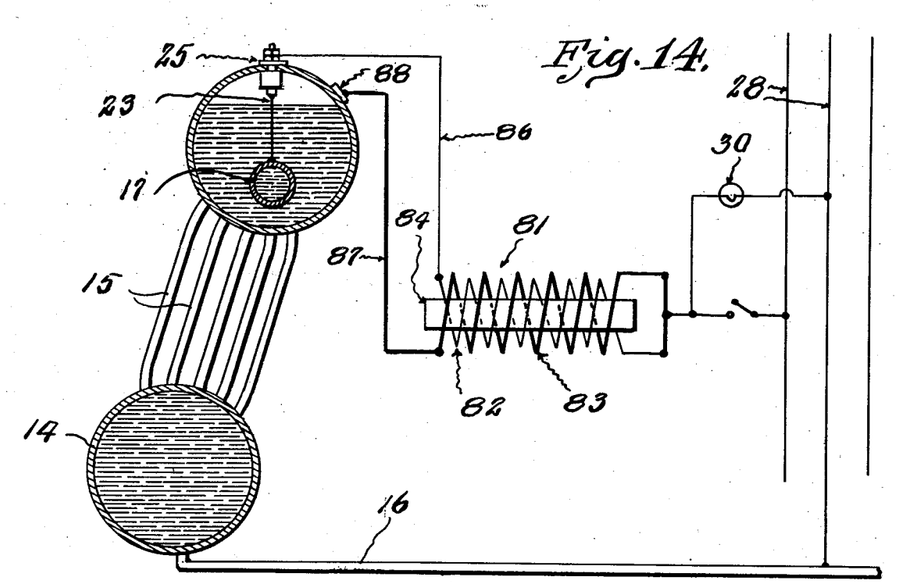
Figure 14 illustrates the application of a method using an inductive resistance having two windings connected to the steam generator unit.
Figure 14A:
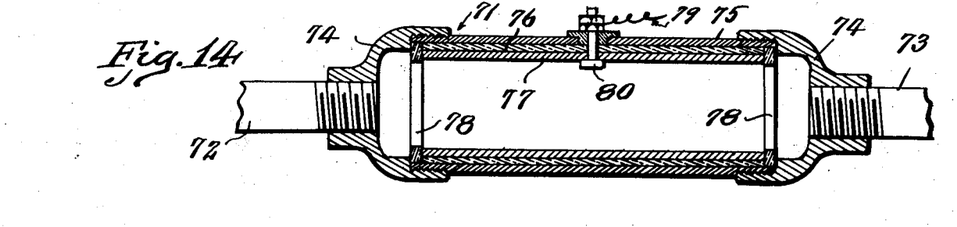

In the modification method shown in Figure 14 an inductive resistance 81 is placed in the exciting circuits. This resistance comprises two coils 82 and 83 wound in an iron core 84. One terminal of each coil is connected by a connector 85 to one of the main supply lines, the other supply line being connected to the blow-off pipe 16. The opposite terminal of coil 82 is connected by a connection 86 to the metal element 24 while the corresponding terminal of the other coil 83 is connected by a connection 87 to the metal shell of cross drum at 88. This form of resistance takes the place of the transformer and is to be used where the volume of electric current is not excessive.

The function of this resistance is to limit the flow of alternating current from the source of supply to the internal distributors and to the metallic content of the boiler. This inductive resistance can be constructed so that electric currents of differing values may be taken through each winding, although the iron core is used jointly by each coil.

By my improved method and means the effects of the thermo-dynamically generated direct current (self-generated by every steam or hot-water unit) are effectively disorganized by the novel use of alternating current whose characteristics are especially adaptable to such method and means of prevention. In other words, this invention sets up novel conditions and set of circumstances whereby the more powerful alternating current will not electro-magnetically affect the scale matter contained in the feed-water supply but on the contrary will prevent the thermo-dynamic (self-generated) direct current from electro-magnetically affecting said scale matter, thereby checking the scale-forming propensity of said generated current. Hence, by the use of my invention the scale matter is not fixed by either current and as a consequence is kept in a perfectly soluble state.

I am aware of the various direct current systems which have been and are still being tried out for the prevention of scale in steam boilers. These systems include the employment of either an electric generator, a thermocouple, or a thermopile.

The results from these systems are varied but unsatisfactory, for the reason that in none of them is disclosed a clear-cut understanding of the source of current which they are to counteract. Again, these systems depend, for successful operation, upon a very accurate and minute adjustment of the opposing current and as is well known, the operating conditions of any modern boiler are never constant but vary frequently. Therefore, it follows that the electrical energy or self-generated current which such a boiler thermoelectrically generates is likewise never constant, but varies in accordance with the varying operating conditions of the boiler. Sometimes the externally applied opposing current may be in supremacy and other times the current generated by the boiler may be so. In either event, scaling of the plates will take place from the excess energy of the current that is in supremacy.

In my new method, the use of the alternating current obviates any and all necessity for any nicety of balancing the degree or strength of these opposing currents. I simply increase the strength or intensity of the external alternating current until I obtain the desired results and then secure that adjustment. Furthermore, there is no tendency of this class of current (alternating) to "pit" the boiler plates as there is with the use of direct current; in fact, experience has shown that all tendency to "pit" has disappeared with the employment of alternating current.

While I have shown and described the preferred methods of my invention, it is obvious that various changes could be made in the construction and arrangement of the same without departing from the spirit thereof.

I claim:

1. The method of preventing scaling and corrosion of metal liquid containers subjected to varying temperatures, consisting in electrically exciting said container and its liquid content by two alternating currents having different phase relation with respect to each other.

2. The method of preventing scaling and corrosion of metal water containers subjected to varying temperatures, consisting in electrically exciting said container and its water content simultaneously by a plurality of alternating currents having differential characteristics relative to each other whereby said currents do not interfere with each other.

3. The method of preventing scaling and corrosion of water boilers and accessories therefor, consisting in simultaneously electrically exciting the metal shell of a boiler and the water contained therein, independently by two alternating currents having differential electrical relationship with respect to each other, said alternating currents being applied to said boiler and the water content thereof at points remote from each other.

4. The method of preventing scaling and corrosion of steam and hot water boilers and accessories therefor which consists in subjecting said boiler and its water content to the simultaneous action of two alternating currents having differential relationship, the primary current being applied to a feed water element and to a remote portion of said boiler and the secondary current being applied to said boiler at points remote from each other and having comparatively large temperature differences.

5. In an apparatus of the class described, the combination with the metal shell of a water container, of a transformer adapted to be energized by a suitable source of electrical energy, a distributing element disposed in the water of said container and insulated from the metal shell of said container, connections for connecting the primary circuit of said transformer to said distributing element and to a portion of the metal shell of the container to cause the primary current to travel through said metal shell of said container and its water content, and connections for connecting the secondary circuit of said transformer to the metal shell of said container at points of greatest difference of temperature prevailing therein.

6. In an apparatus of the class described, the combination with a steam boiler or the accessories therefor, of a transformer adapted to be energized by a suitable source of electric energy, a distributing element disposed in the water of said boiler and insulated from the metal shell of said boiler, a connector arranged in the shell of said boiler and insulated therefrom, a connection leading from the inner end of said connector to said distributing element, a connection connecting the projecting end of said connector to one of the terminals of the primary coil of said transformer, a connection connecting the other terminal of said primary coil to one pole of said source of electrical energy, a connection connecting the other pole of said source of electrical energy to the metal shell of said container at a point having a comparatively low degree of temperature, thereby causing the primary current to travel through the metal shell of said boiler and its water content, and connections for connecting the terminals of the secondary coil with said boiler for causing the secondary current to travel through said boiler metal shell simultaneously with the primary current.

7. In an apparatus of the class described, the combination with a steam boiler and a feed water pipe for supplying water thereto, of a hollow conducting element arranged in the water of said boiler and insulated from the walls thereof, an electric circuit for electrically exciting said boiler and its water content, said circuit having one terminal connected to said conducting element and the other terminal to a metal portion of said boiler, the latter terminal being connected to said boiler at a point having a comparatively low degree of temperature, and a pipe connection connected to said feed water pipe and leading into said boiler for discharging feed water over the electrically charged surfaces of said distributing element to insure thorough distribution of electrical current through the water content of said boiler.

8. In a device of the class described, the combination with a boiler, of a hollow perforate distributing member disposed in said boiler and insulated therefrom a pipe connection connected to a water feed system of the boiler and having its discharge end opening into said hollow distributing member for discharging the water thereinto to force the incoming fresh water to pass outwardly through the perforations of said distributing element, and a source of electrical energy having its poles electrically connected respectively to said distributing member and to said boiler for electrically charging the water discharged from said distributing element.

9. In a device of the class described, the combination with a metal water tank subjected to comparatively high degrees of temperatures, of a tubular distributing element arranged in the water in said tank and insulated from the metal wall of the latter, a feed water pipe connection extending into said tank and insulated therefrom, said pipe connection having its end connected to said tubular member to discharge feed water thereinto, an electrical connection connecting one terminal of an exciting electrical circuit to said distributing element and connecting the other terminal of said circuit to the metal wall of said tank, thereby simultaneously electrically exciting the metal wall of said tank and the water contained therein, said distributing element being closed at its end and provided with a plurality of apertures in its peripheral face through which the feed water is discharged therefrom into said tank thereby causing the feed water discharged into said tank to be subjected to electrical treatment during its discharge.

10. The combination with a steam generator and the like, of distributing means submerged in the water content and insulated from the metallic part of said steam generator, a source of alternating current, and an inductive resistance having plurality of windings connected to said source of alternating current and connected to said distributing means and the metallic part of said boiler for causing said steam generator and its water content to be subjected simultaneously to the action of a plurality of electrical currents having different voltage and phase relation with each other.

11. The method of removing and preventing scale deposits in steam boilers and the like which consists in employing a primary and a secondary alternating current to treat the feed water supply and the metallic shell of the boiler, respectively, the feed water supply being treated during its ingress into the boiler to decompose portion of the feed water and thereby liberate the hydrogen content and cause it to enter the general circulation thereby nullifying the self-generated electro-plating tendencies evolved in the natural process of boiler operation and preventing formation of scale.

12. The method of removing and preventing the formation of scale deposits in steam boilers and the like which consists in subjecting said boiler and its water content to the action of two alternating currents, the primary current being applied to a feed water pipe element and to a remote portion of said boiler and the secondary current being applied to said boiler at points of substantially greatest temperature differences.

13. In an apparatus of the class described, in combination, a source of alternating current supply, a distributing element arranged in said boiler and insulated therefrom, a pipe connection for delivering the feed water over said distributing element, an electric circuit for connecting said source of alternating current with said distributing element and with the metal portion of said boiler at points remote from each other, and a supplemental circuit connected to said source of alternating current supply for exciting the metallic content of the boiler independently of the first circuit.

In testimony whereof I hereunto affix my signature this 12th day of November, 1925.

GEORGE SPENCER NEELEY.